Patented May 31, 1927.

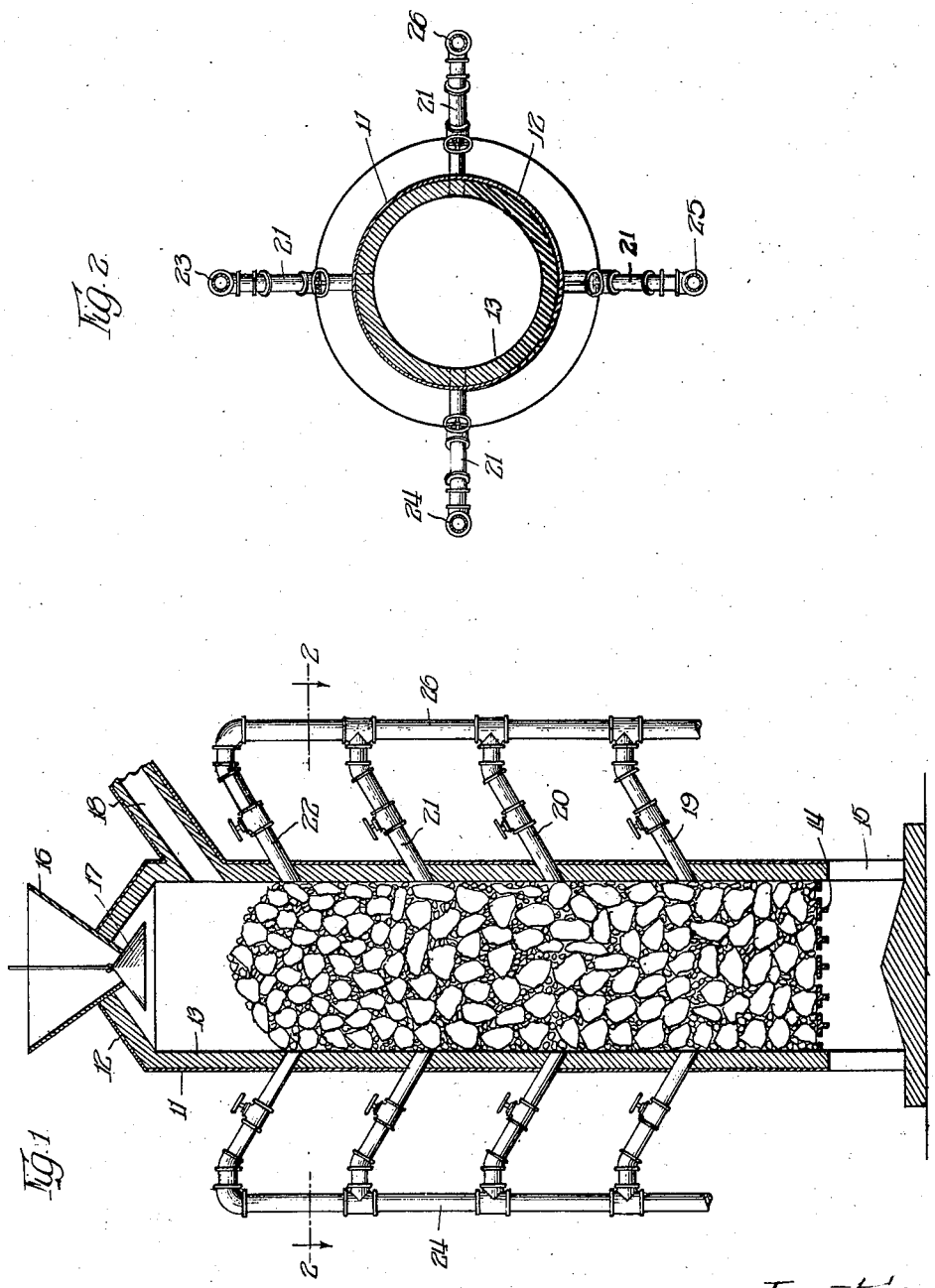

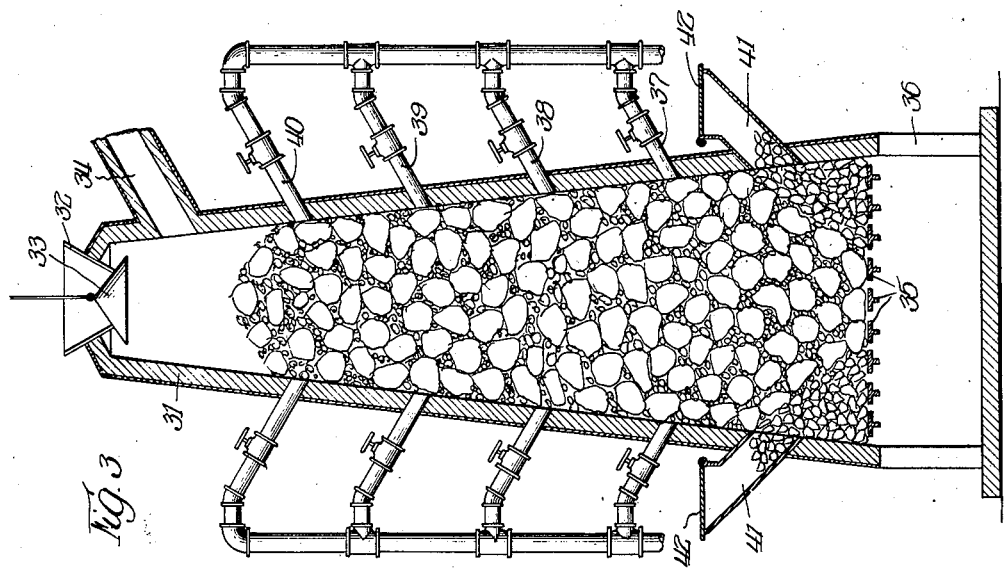
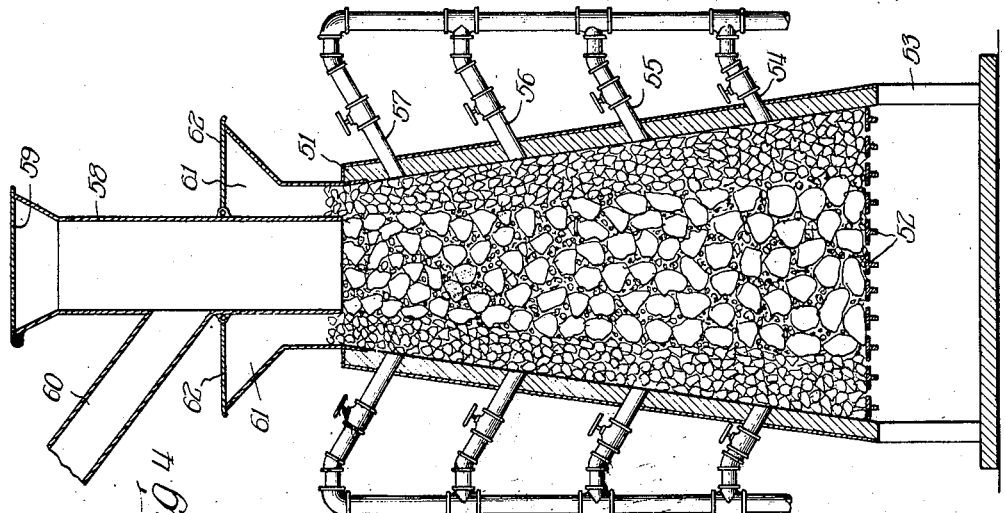

1,630,283

UNITED STATES PATENT OFFICE.

WILLIAM H. WAGGAMAN AND HENRY W. EASTERWOOD, OF CHICAGO HEIGHTS, ILLINOIS, ASSIGNORS TO VICTOR CHEMICAL WORKS, OF CHICAGO, ILLINOIS, A CORPORATION OF ILLINOIS.

PROCESS FOR PRODUCTION OF PHOSPHORIC ACID.

Application filed January 23, 1924. Serial No. 687,931.

This invention relates to a new and useful process for the manufacture of phosphoric acid by the volatilization process, and relates more particularly to a process adapted for the production of phosphorus and phosphoric acid by the volatilization process from either lump or briquetted charges of natural phosphates, silica and coke. It has for its object the bringing about of the necessary chemical reactions more expeditiously and economically than has heretofore been accomplished. A further object of this invention is to maintain throughout the major part of the furnace or kiln, with the least expenditure of fuel, a temperature sufficiently high to bring about the evolution of phosphorus from the furnace charge. It is an object to provide a process whereby the desired reducing conditions may be maintained throughout the necessary portion of the charge and furnace.

Other and further objects will appear as the description proceeds.

It has heretofore been proposed to produce phosphoric acid from mixtures of phosphate rock, silica and coke, or other reducing agent, by heating such mixtures in furnaces of various types, including the electric arc furnace, shaft furnaces of the blast furnace type wherein fuel is used as a heating source, and in rotary kilns of the type ordinarily employed in the manufacture of cement. The present invention, however, relates to methods of operating shaft kilns having in combination therewith certain novel features, which render them particularly adapted to the maintenance of a more uniform temperature than has heretofore been practicable. The kilns are so designed that the elemental phosphorus driven off from the charge can be burned substantially throughout the length of the shaft and this heat of combustion utilized for heating the fresh incoming charge and that portion of the charge which has not yet been brought to the required temperature. In this way a high temperature may be maintained and substantially all the phosphorus evolved with a minimum expenditure of fuel.

While a temperature sufficient to bring about reactions between mixtures of phosphate rock, silica and coke, can be attained in the lower portion of an ordinary lime kiln, the nature of the charge employed is such that the high temperature zone cannot extend to any great height within the kiln. Unlike a blast furnace as a rule, these kilns do not operate under heavy air pressure and therefore the quantity of air drawn in near the base is rather limited. The burning of the fuel in the lower portions of the kiln therefore soon uses up this air and as the gases proceed up the shaft in contact with hot coke, they become so depleted in oxygen that combustion soon ceases. Moreover, the reduction of the phosphoric acid in the natural phosphates to elemental phosphorus is a highly endothermic reaction, entailing the absorption of so much heat that the temperature of the upper part of the kiln is brought below the point at which this reaction will take place.

While the maintenance of reducing conditions is essential to bring about the elimination of phosphorus from charges of phosphate rock, silica and coke, at temperatures ranging from 1200 to 1500° C., it is highly desirable to regenerate and return to the system the major part of the heat absorbed under these reducing conditions. Where phosphoric acid, and not elemental phosphorus, is the product sought, this return of heat to the system can be readily accomplished by burning the evolved phosphorus almost as soon as it is set free, by introducing into the kiln at various points up the shaft regulated supplies of auxiliary air or oxidizing gases.

Another reason why ordinary lime kilns have not been operated successfully with the phosphate charge, is, that heretofore it has been commonly supposed that the ratio of silica to lime in charges suitable for the complete or nearly complete volatilization of phosphoric acid, must be such as to give a fusible slag. Unless the temperature of such charges is raised to a point where the slag obtained is quite molten, semi-fused masses are obtained which tend to clog the shaft, interfering with the regular operation thereof, and in kilns of the type ordinarily employed in burning lime, it is difficult to maintain slag in such a fluid condition.

We have found, however, that it is not essential to have present an amount of silica in such charges which will give a fusible slag when the mass is heated to a temperature as high as 1450° C., and have been able to so proportion the ingredients in the charge that the residual material obtained after the partial or complete elimination of phosphoric acid is still in a solid or sintered condition.

In our co-pending application, Serial No. 686,891, filed January 17, 1924, we have described a briquetted charge consisting of an intimate mixture of finely ground natural phosphate, silica and coke or other solid reducing agent, wherein the ratio of lime to silica is somewhat greater than that in calcium ortho silicate ($Ca_2SiO_4$) in which the ratio of lime to silica is 1.86 to 1. The fusing point of such mixtures not only is higher than the temperature which should be obtained in the shaft kiln, but also considerably above that necessary to bring about a reaction wherein the phosphorus is volatilized. While we prefer to use a briquetted charge of the type mentioned above, mixed with lump coke for fuel purposes, we do not wish to be limited to the use of briquettes, since under certain conditions, the various ingredients may also be employed in large fragments or lump form.

In carrying out this invention, we propose to employ a kiln of the shaft type, several modifications of which are illustrated in the accompanying drawings. The main principle employed, however, in all of these modifications is essentially the same, and consists in introducing at various heights along the shaft, limited quantities of air or oxidizing gases to augment that drawn in at the base of the kiln. The quantity of auxiliary air introduced at these points may be so regulated as to burn only the elemental phosphorus or phosphorus and carbon monoxide freed by the reducing reactions in the zones immediately below said inlets. The quantity of air admitted, however, should be limited, so as to burn only a minimum amount of the solid fuel which is a part of the furnace charge and which is burned chiefly by the air admitted at the base of the kiln.

In case it is desirable, however, to burn coke or other solid fuel also at the points of entrance of the auxiliary air, in order to increase still further the temperature of the system, a somewhat modified form of this shaft kiln may be employed, wherein provision is made for feeding additional coke or solid fuel to the kiln in such a way that it will descend close to the inner walls thereof, and form a more or less protective layer around the phosphate charge, protecting it from oxidizing influences which would burn out the reducing agent incorporated with the said charge.

Again, in order to insure the presence of sufficient coke at the base of the kiln, where the residue is discharged, to maintain a proper temperature, a further modification of this shaft kiln may be employed wherein provision is made for feeding coke or other solid reducing agent into the shaft close to the lower end thereof.

We have illustrated in the accompanying drawings, certain preferred embodiments of apparatus adapted for carrying out our process.

In the drawings—

Figure 1 is a vertical section through one type of furnace;

Figure 2 is a transverse section taken on line 2—2 of Figure 1;

Figure 3 is a view similar to Figure 1, but showing a modified form of construction; and Figure 4 is a view similar to Figure 3 showing a further modified form.

Referring first to the form of construction shown in Figures 1 and 2, the substantially cylindrical furnace 11 comprises the metal shell 12 having brick lining 13. The grate 14 is located in the lower end of the furnace and supports the charge. The ashes are removed through openings 15. The materials of the charge comprising phosphate rock, silica and a reducing agent such as coke, are introduced at the upper end of the furnace through the hopper 16, the flow being controlled by the bell 17. The flue 18 is provided at the upper end of the furnace for withdrawing the gaseous products of the process.

A plurality of tuyères or air inlets 19, 20, 21 and 22 are provided at points spaced vertically of the furnace. These tuyères are each controlled by a valve and are fed from the headers 23, 24, 25 and 26.

The form of construction shown in Figure 3 comprises a frusto-conical furnace 31 which is larger at its lower end. Material is fed at the upper end by hopper 32 controlled by bell 33, and the gaseous products of combustion are carried off through flue 34. The furnace is provided with the grate 35 and ash discharge openings 36. It is provided, also, with the vertically spaced series of tuyères 37, 38, 39 and 40. The lower portion of the furnace is provided with a plurality of circumferentially spaced hoppers 41, each of which are provided with a cover 42.

The form of construction shown in Figure 4, comprises the frusto-conical furnace 51 having the grate 52 and ash discharge openings 53. The furnace is provided with the vertically spaced series of tuyères 54, 55, 56 and 57. At its upper end it is provided with the centrally disposed hopper 58, closed by cover 59. The flue 60 leads from the hopper 58. The circumferentially extending hopper 61 surrounds the hopper 58 and its upper side is closed by a plurality of doors 62.

In the operation of the form of furnace shown in Figures 1 and 2 the mixed charge comprising coke or other reducing agent, together with the desired portions of phosphate rock and silica is introduced through the hopper 16, its introduction being controlled by raising and lowering the bell 17. The greater portion of the air necessary for carrying on the combustion, enters the lower portion of the furnace through the grate bars 14. As has been stated, however, this air is not sufficient to cause the necessary combustion to properly heat the upper portion of the furnace. Consequently controlled amounts of air are introduced through the spaced series of tuyères 19, 20, 21 and 22. The amount of air introduced through each series of tuyères or through each tuyère may be controlled so as to provide a close control of the temperature and of the reducing action throughout the height of the furnace. Sufficient air may be introduced to burn only the free phosphorus or enough may be introduced to burn part of the fuel charge.

In the form of construction shown in Figure 3, the mixed charge is introduced at the top in the manner just described. However, the combustion in the upper portions of the furnace, due to the air introduced through the tuyères, may be such as to largely burn the coke before it reaches the lower portion of the furnace. Therefore, additional coke is introduced at the lower portion of the furnace through the hoppers 41. The amount of this coke may be regulated so as to provide the exact amount necessary for combustion at that point.

The form of construction shown in Figure 4 is operated in a manner similar to those forms already described. The mixture of phosphate rock, silica and fuel is introduced through hopper 58. This mixture is, however, enclosed in a protective layer of coke which is introduced through the circumferential hopper 61. This coke works down adjacent the sides of the furnace and furnishes fuel for combustion with the air introduced through the tuyeres. The coke mixed with the phosphate rock and silica of the charge acts as a reducing agent with the charge.

We have illustrated three different forms of furnaces adapted for carrying out our process, but it is to be understood that it may be carried out with other forms of furnaces. We, therefore, contemplate such changes in construction and operation as come within the spirit and scope of the following claims.

We claim:

1. The process for the production of phosphoric acid which comprises heating by means of solid fuel an extended mass of mixed phosphate rock, silica and coke, introducing oxidizing gases at one end of said mass to burn said fuel and introducing additional oxidizing gases at a plurality of points along said mass to oxidize the phosphorus evolved by the reactions between the constituents of the charge.

2. The process for the production of phosphoric acid which comprises heating by means of solid fuel a vertically extending mass of mixed phosphate rock, silica and coke, introducing oxidizing gases at the bottom of said mass to burn said fuel and introducing additional oxidizing gases at a plurality of vertically spaced points along said mass to oxidize the phosphorus evolved by the reactions between the constituents of the charge.

3. The process for the production of phosphoric acid which comprises heating by means of solid fuel a vertically extending mass of mixed phosphate rock, silica and coke, and maintaining an approximately uniform temperature throughout the height of the mass by introducing at spaced points along said height, regulated quantities of oxidizing gases, said gases burning with the phosphorus and carbon monoxide evolved by reactions in the lower portions of the mass.

4. The process for the production of phosphoric acid which comprises heating by means of solid fuel a vertically extending mass of mixed phosphate rock, silica and coke, and maintaining an approximately uniform temperature throughout the height of the mass by surrounding said mass with a layer of additional coke and introducing into said layer of coke at vertically spaced points, additional oxidizing gases.

Signed at Chicago Heights, Illinois, this 19th day of January, 1924.

WILLIAM H. WAGGAMAN.
HENRY W. EASTERWOOD.